Sept. 3, 1963 E. G. SANNES 3,102,290
MEAT BRUSHING APPARATUS
Filed April 30, 1962 2 Sheets-Sheet 1

INVENTOR.
ELMER G. SANNES
BY FULWIDER, MATTINGLY
& HUNTLEY

ATTORNEYS

Sept. 3, 1963 E. G. SANNES 3,102,290
MEAT BRUSHING APPARATUS
Filed April 30, 1962 2 Sheets-Sheet 2

INVENTOR.
ELMER G. SANNES
BY FULWIDER, MATTINGLY
& HUNTLEY

ATTORNEYS

United States Patent Office

3,102,290
Patented Sept. 3, 1963

3,102,290
MEAT BRUSHING APPARATUS
Elmer G. Sannes, 701 Marshall Place,
Long Beach, Calif.
Filed Apr. 30, 1962, Ser. No. 190,950
10 Claims. (Cl. 15—3.17)

The present invention relates generally to apparatus for brushing foods, and more particularly to meat brushing apparatus for removing bone dust from individual steaks and chops after they have been sawed from the main body of the meat.

In the preparation of food products for sale and consumption, it is often desired to brush the surface thereof to remove foreign matter which detracts from the appearance or is undesirable from a consumption standpoint. This is particularly true in the case of individual steaks and chops which have been cut from a large body of meat with attendant sawing of the bone of the meat and littering of the surfaces of the individual steaks and chops with bone dust resulting from the sawing operation. The appearance of such individual steaks and chops will be rendered much more attractive if such bone dust and any other foreign matter there may be is brushed from the surface of the steaks and chops before they are displayed for sale and consumed.

It is therefore an object of the present invention to provide improved apparatus for brushing the surface of foods.

Another object of this invention is the provision of improved food brushing apparatus employing upper and lower traveling belts and upper and lower brushes rotating oppositely to the direction of belt travel and in which the food is moved by the belts between the brushes to brush clean opposite surfaces on the food.

Another object of this invention is the provision of improved apparatus for brushing the surface of individual steaks and chops, having a stationary rotating brush for brushing one side of the steak or chop, and a movable rotating brush for brushing the other side, in which the movable brush is automatically positioned to accommodate pieces of different thickness as they are moved through the apparatus to effect a brushing operation thereon.

A further object of this invention is the provision of an improved meat brushing apparatus employing stationary and movable rotating brushes between which the meat is passed to brush clean the opposite surfaces thereof, in which the movable brush is mounted in a head having a forward cam surface engaged by the meat as it moves toward the brushes to position the head and automatically compensate for the thickness of the piece of meat passing through the apparatus.

These and other objects and features of the invention will be readily apparent to those skilled in the art from the following specification and the appended drawings in which.

Figure 1:
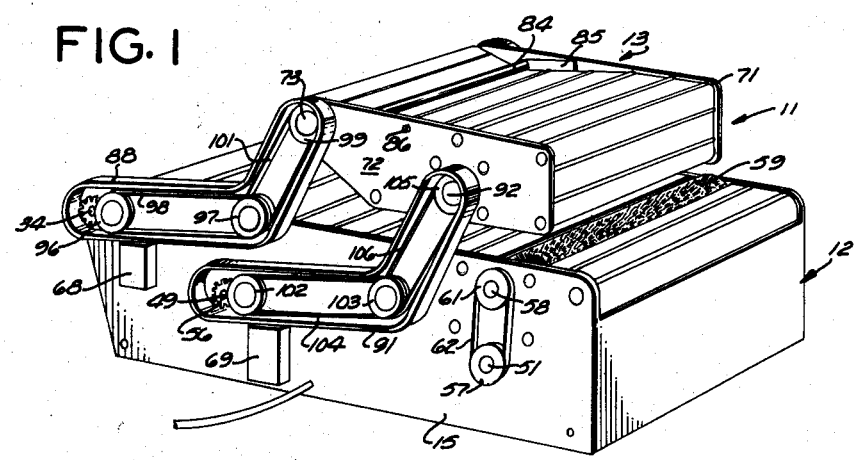
FIGURE 1 is a perspective view of the meat brushing apparatus according to the present invention taken mainly from the right rear and with the movable brushing head in raised position to show the lower movable platform.

The food brushing apparatus according to the present invention is indicated generally at 11, and comprises a base unit 12 and a movable head unit 13. The base unit 12 is made up of side plates 14 and 15 and end plates 16 and 17 rigidly connected together in any desired manner as, for example, by internal brackets (not shown). On the interior surfaces of the side plates 14 and 15 and adjacent the bottom thereof are mounted angle brackets 18 and 19 upon which are carried transverse angle brackets 21 and 22 supporting a driving motor 23. The motor 23 has a shaft 24 extending therethrough and having mounted on its left end a sprocket 25 and on its right end a gear pulley 26. About the sprocket 25 is a drive chain 27 which also engages a driven sprocket 28 rigidly mounted with a gear wheel 29 on a shaft 31 pivoted in side plate 14. A cylindrical drive member 32 has a pair of stub shafts 33 and 34 extending from its opposite ends and pivoted respectively in the side plates 14 and 15. Rigidly mounted on the stub shaft 33 is a gear wheel 35 meshing with the gear wheel 29 so as to effect rotation of the drive cylinder 32.

Figure 3:
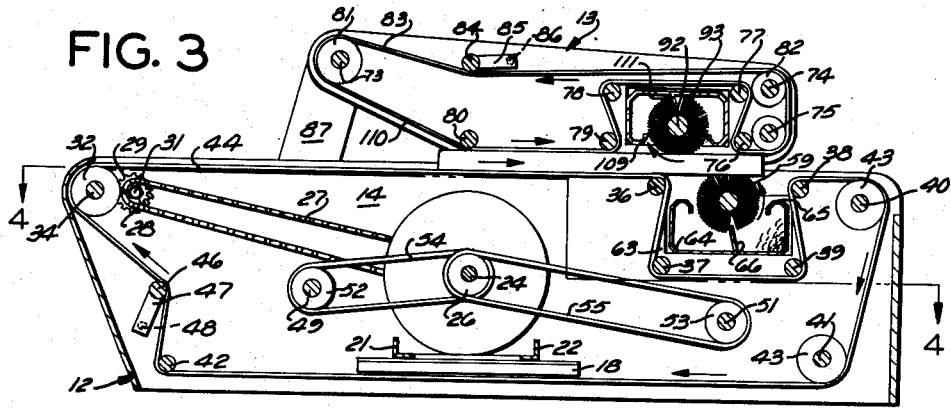
FIGURE 3 is a vertical sectional view through the meat brushing apparatus of this invention.
Figure 4:
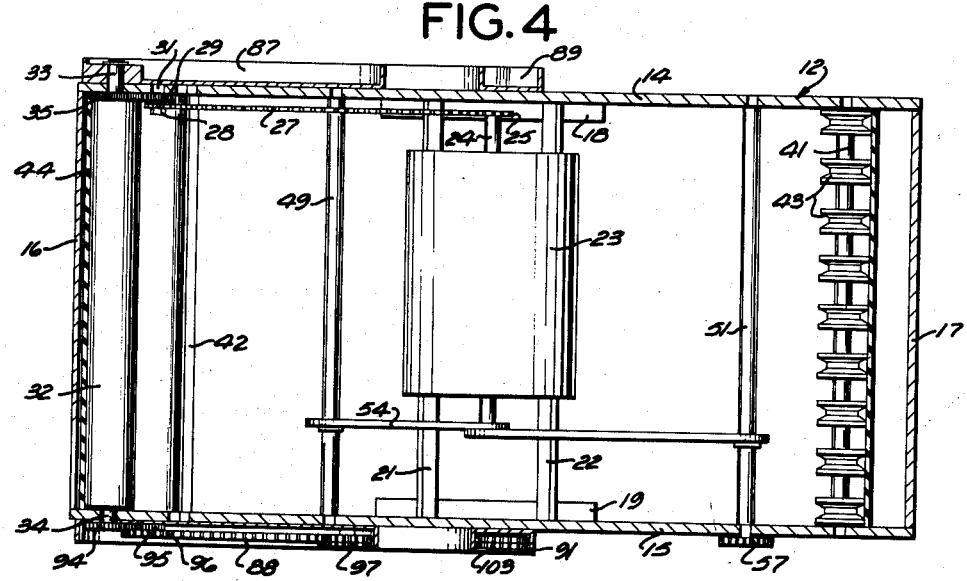
FIGURE 4 is a horizontal sectional view on the lines 4—4 of FIGURE 3.

Rotatably mounted in the opposite side plates 14 and 15 are a plurality of shafts 36, 37, 38, 39, 40, 41 and 42. Upon the shafts 40 and 41 are mounted spaced spools 43. Threaded about the drive roller 32, the shafts 36 through 42 and the spools 43, as more particularly shown in FIGURE 3, is a flexible, lower traveling belt 44 having outer ribs 45 thereon. The belt 44 forms a movable platform upon which the slab of meat or other food is placed to be carried through the brushing apparatus. An idler shaft 46 is mounted on opposite arms 47 which are pivoted in the opposite side plates 14, 15, as at 48, and is biased against the traveling belt 44, as by spring means (not shown), to maintain tension on the belt.

A pair of shafts 49 and 51 are also pivoted in the opposite side plates 14, 15, and have gear pulleys 52 and 53 respectively, mounted thereon. A drive belt 54 interconnects the gear pulley 52 and the gear pulley 26 on the motor shaft 24, and a drive belt 55 interconnects the gear pulley 53 and the gear pulley 26 to thereby effect rotation of the shafts 49 and 51. The shaft 49 extends to the outside of the side plate 15 and has a gear wheel 56 mounted on its end. Shaft 51 extends to the outside of side plate 15 and has a gear wheel 56 mounted on its end. Shaft 51 extends to the outside of side plate 15 and has a gear pulley 57 on its end. A brush shaft 58 carrying a cylindrical brush 59 is rotatably mounted in the opposite side plates 14 and 15, and at its right-hand end carries a gear pulley 61 at the outside of the side plate 15. A drive belt 62 interconnects gear pulleys 57 and 61 to effect rotation of the brush 59.

The side wall 14 is provided with an opening 63 through which extends an open-top trough 64 substantially surrounding the brush 59. The trough 64 extends transversely across the space between the side plates 14 and 15 and its inner end is supported upon the side plate 15 on a suitable bracket (not shown). The trough 64 has its top edges return-bent, as shown at 65, and has an upwardly projecting center blade 66 engaging the edge of the brush 59. Bone dust and other foreign material brushed from the surface of the food passing through the apparatus will be collected in the trough 64 and may be removed therewith for dumping.

The head unit 13 is comprised of a pair of side plates 71 and 72, interconnected by a plurality of transverse shafts rotatably mounted therein. The transverse shafts carrying the upper traveling belt are shown at 73, 74, 75, 76, 77, 78, 79 and 80. Upon the shaft 73 is mounted a drive cylinder 81, similar to the drive cylinder 32, and upon the shafts 74 and 75 are mounted spools 82, similar to the spools 43. About the shafts 73 through 80, the cylinder 81 and the spools 82 is threaded the upper, food-engaging, traveling belt 83, as shown in FIGURE 3. A belt tensioning shaft 84 is mounted in side arms 85 pivoted as at 86 in the head plates 71, 72. The shaft 84 is biased against the belt 83 by suitable spring means (not shown) to take up the slack in the belt.

A pair of opposite crank arms 87 and 88 are pivotally mounted at their opposite ends to the stub shafts 33, 34, and the shaft 73. A pair of opposite crank arms 89 and 91 are pivoted adjacent their opposite ends to shafts 49 and 92. The shaft 92 is pivotally mounted in the head side plates 71, 72, and carries the upper rotating cylindrical brush 93. The crank arms 87, 88 and 89, 91 permit the head unit 13 to be raised and lowered parallel to itself to accommodate meat or other food of varying thickness passing through the brushing apparatus.

Upon the stub shaft 34 is rigidly secured a gear wheel 94 meshing with a gear wheel 95 pivoted in the crank-arm 88. Rigid with the gear wheel 95 is a gear pulley 96. At the elbow of the crank arm 88 is a double gear pulley 97 and a drive belt 98 interconnects the gear pulleys 96 and 97. Upon the shaft 73 carrying the drive cylinder 81 is mounted a gear pulley 99 and a drive belt 101 interconnects gear pulleys 97 and 99 to effect rotation of the drive cylinder 81. Gear wheel 56 meshes with a gear wheel (not shown) rigid with a gear pulley 102 pivotally mounted on the crank arm 91. A double gear pulley 103 is pivotally mounted on the crank arm 91 at the elbow thereof. A drive belt 104 interconnects the gear pulleys 102 and 103. A gear pulley 105 is rigidly mounted on the end of the brush shaft 92 and a drive belt 106 interconnects gear pulleys 103 and 105 to effect rotation of the brush 93.

The side plate 71 of the head unit 13 is provided with an opening 107 through which extends an inverted, open bottom trough 108 substantially surrounding the brush 93. The inner end of the trough 108 is supported on a suitable bracket (not shown) on the head unit side plate 72. The inverted trough 108 has its ends return-bent as shown at 109 so as to retain bone dust and other material brushed from the surface to the meat or other food passing through the apparatus. A blade 111 within the inverted trough 108 engages the surface of the brush 93. The trough 108 is readily removable from the head unit 13 to dump the material collected therein on the return-bent portions 109.

Figure 5:
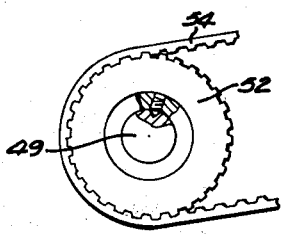
FIGURE 5 is a detail view showing a drive belt and geared pulley arrangement.

In FIGURE 5 there is illustrated one of the cooperating drive belts and gear pulleys, of which follow substantially the same structure. Illustrated is the drive belt 54 and the gear pulley 52 on the shaft 49. The under surface of the drive belt 54 is in the form of a flexible rack having gear teeth and depressions thereon meshing with the gear teeth and depressions in the outer surface of the gear pulley 52. With this arrangement the drive between the belts and the gear pulleys is positive, and there is no slippage between their engaging surfaces.

Figure 2:
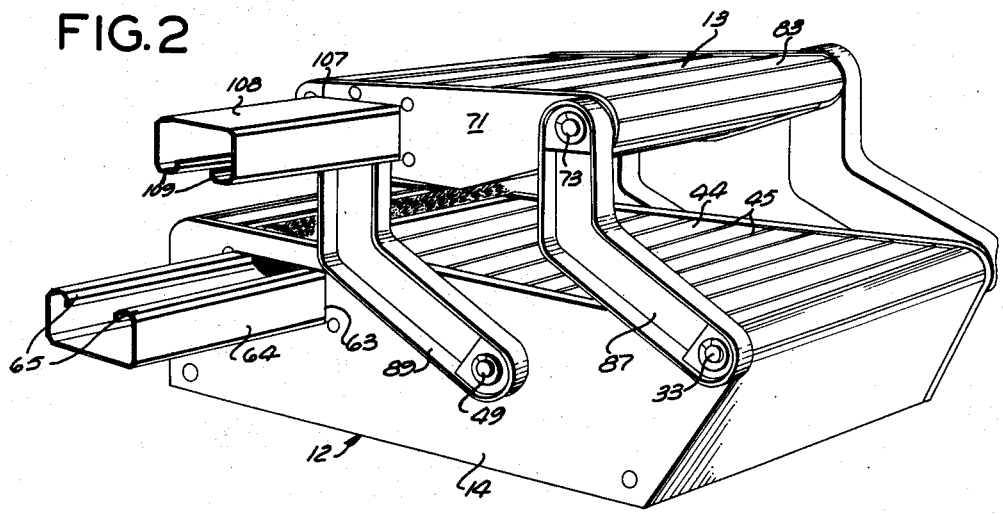
FIGURE 2 is a perspective view of the meat brushing apparatus according to the present invention taken mainly from the left front, and also showing the movable brushing head in raised position.

As will be seen from FIGURES 2 and 3, the belt 83 inclines downwardly at the front at 110 to form what is substantially a cam surface engaging the steak, chop or other food traveling through the apparatus on the platform belt 44. The position of the head unit 13 will be determined by the thickness of the meat or other food passing through the brushing apparatus as the food is engaged by the camming plane 110 of the belt 83. Because of the crank arms 87, 88, 89 and 91 and their pivotal connections at their opposite ends to the base unit 12 and the head unit 13, the head unit will always move parallel to itself as it is raised and lowered, so that the portion of the traveling belt 83 to the rear of the inclined plane 110 will be substantially horizontal and in engagement with the flat top surface of a steak or chop which is carried on the horizontal traveling platform belt 44. Stops 68 and 69 are engaged by the arms 88 and 91 to limit the lowermost position of the head unit 13 with the rotating brushes out of engagement with the opposed traveling belts.

In the operation of the brushing apparatus of the present invention, the motor 23 is energized to effect rotation of its shaft 24. This rotates the drive cylinder 32 from the sprocket 25, chain 27, sprocket 28, gear wheel 31, and gear wheel 35. With rotation of the drive cylinder 32, the traveling platform belt 44 will be moved in a continuous manner in the directions of the arrows of FIGURE 3, so that a steak, chop, or other food placed on the front of the platform, that is, at the left end of FIGURE 3, will be moved to the right and between the brushes 59 and 93. The drive cylinder 81 will also be rotated from the rotation of the drive cylinder 32 through the gear wheels 94, 95, gear pulley 96, drive belt 98, gear pulley 97, drive belt 101, and gear pulley 99 which rotates shaft 73 and the driving cylinder 81 thereof. This effects movement of the upper traveling belt 83 in the direction of the arrows of FIGURE 3, so that the adjacent portions of the belts 44 and 83 move in the same direction and at substantially the same speeds to effect movement of the meat or other food through the apparatus.

The brushes 59 and 93 are rotated in the direction of the arrows of FIGURE 3, that is, contrary to the direction of movement of the food through the brushing apparatus. Brush 59 is rotated through the gear pulley 26 on the shaft 24, drive belt 55, gear pulley 53, shaft 51, gear pulley 57, drive belt 62, gear pulley 61, and shaft 58. Brush 93 is rotated from gear pulley 26, drive belt 54, gear pulley 52, shaft 49, gear wheel 56 meshing with a gear wheel (not shown) rigid with the gear pulley 102, drive belt 104, gear pulley 103, drive belt 106, and gear pulley 105 on the shaft 92.

As the steak, chop, or other food is placed on the platform belt 44, it will be moved toward the right as viewed in FIGURE 3, and will engage the inclined plane 110 of the belt 83 to raise the head unit 13 to accommodate the thickness of the food passing through the apparatus. The food will continue under the drive of both traveling belts 44 and 83, and will pass beneath the rotating brush 93 and over the rotating brush 59, and exit from the apparatus at the back thereof. Bone dust or other foreign matter on the surfaces of the food will be brushed therefrom and collected in the troughs 64 and 108. The cleaned food is removed from the rear of the machine and is ready for display or wrapping. As the bone dust or other foreign matter is accumulated in the troughs 64 and 108, they may be removed from the base unit 12 and head unit 13 for dumping. In this passage of the meat cut or other food through the brushing machine, it will be apparent that the inclined portion 110 of the upper belt 83 acts as a camming surface to force the head unit 13 upwardly to accommodate the thickness of the food passing through the machine.

While a certain preferred embodiment of the invention has been specifically illustrated and described, it will be understood that the invention is not limited thereto as many variations will be apparent to those skilled in the art and the invention is to be given its broadest interpretation within the terms of the following claims.

I claim:

1. Food brushing apparatus comprising: a base unit and a head unit movable relative thereto; pivoted arm means interconnecting said base and head units so as to effect movement of said head unit toward and away from the base unit while maintained parallel thereto; a driven endless belt on each of said units, said belts having opposed, substantially parallel faces adapted to have the food to be brushed disposed therebetween; means for driving said parallel belt faces in the same direction at substantially the same speed; a rotating brush on each of said units disposed transversely of said belts in positions to engage the opposite surfaces of food passing between the units; and means for rotating said brushes, the belt on said head unit having the lower forward portion thereof at the food receiving end of the apparatus in an inclined plane acting as a cam surface engaging the food as it moves rearwardly on the base unit belt to raise the head unit to accommodate the thickness of the food passing through the apparatus and thereby automatically adjust the position of the head unit to accommodate different thicknesses of food.

2. Food brushing apparatus comprising: a base unit and a head unit movable relative thereto; pivoted arm means interconnecting said base and head units so as to effect movement of said head unit toward and away from the base unit while maintained parallel thereto; a traveling endless belt on each of said units, said belts having opposed, substantially parallel faces adapted to have the food to be brushed disposed therebetween; means for driving said parallel belt faces in the same direction with substantially the same speed; a rotating brush on each of said units disposed transversely of said belts in positions to engage the opposite surfaces of food passing between the units; and means for rotating said brushes; the forward end of said head unit being positioned substantially rearwardly of the forward, food-receiving, end of the base unit so that food may be placed on the base unit belt and moved thereby without initial interference with the head unit, the belt on said head unit having the lower forward portion thereof in an inclined plane acting as a camming surface engaging the food as it moves rearwardly on the base unit belt so as to automatically position the head unit to accommodate different thicknesses of food.

3. Food brushing apparatus comprising: a base unit; a head unit; means pivotally mounting said head unit on said base unit to permit movement of the head unit toward and away from the base unit; a traveling endless belt on each of said units mounted to provide opposed, substantially parallel faces adapted to have the food to be brushed disposed therebetween; a rotating brush on each of said units disposed transversely of said belts in positions to engage the opposite surfaces of food passing between said belts; means on said head unit engageable with food moving rearwardly through the apparatus to automatically position the head unit to accommodate different thicknesses of food; a single motor mounted in said base unit; and means connecting said belts and brushes with said motor so as to effect driving of the traveling belts and rotating of the brushes on both the base and head units from said single motor.

4. Food brushing apparatus comprising: a base unit and a head unit movable relative thereto; pivoted arm means interconnecting said base and head units so as to effect movement of said head unit toward and away from the base unit while maintained parallel thereto; a driven endless belt on each of said units, said belts having opposed, substantially paralled faces adapted to have the food to be brushed disposed therebetween; a rotating brush on each of said units disposed transversely of said belts in positions to engage the opposite surfaces of food passing between the units, the belt on said head unit having the lower forward portion thereof at the food-receiving end of the apparatus in an inclined plane acting as a cam surface engaging the food as it moves rearwardly on the base unit belt to raise the head unit to automatically adjust the position of the head unit to accommodate different thicknesses of food; a single motor mounted in said base unit; and means interconnecting said traveling belts and brushes with said base unit for driving the traveling belts and rotating the brushes on both the base and head units from said single motor, the driving connection between said motor and the traveling belt and rotating brush on the head unit including driving means carried by and movable with the pivoted arm means interconnecting the base and head units.

5. Food brushing apparatus comprising: a base unit and a head unit movable relative thereto; pivoted arm means interconnecting said base and head units so as to effect movement of said head unit toward and away from the base unit while maintained parallel thereto; a driven endless belt on each of said units, said belts having opposed, substantially parallel faces adapted to have the food to be brushed disposed therebetween; means for driving said parallel belt faces in the same direction at substantially the same speed; a rotating brush on each of said units disposed transversely of said belts in positions to engage the opposite surfaces of food passing between the units; means for rotating said brushes, the belt on said head unit having the lower forward portion thereof at the food receiving end of the apparatus in an inclined plane acting as a cam surface engaging the food as it moves rearwardly on the base unit belt to automatically adjust the position of the head unit to accommodate different thicknesses of food; and troughs mounted on said base and head unit adjacent to the rotating brushes thereon for receiving foreign material brushed from the surface of the food passing through the apparatus, said troughs being readily removable to dump the foreign material from the apparatus.

6. Food brushing apparatus comprising: a base unit; a head unit; means interconnecting said base and head units and providing for movement of the heat unit to and from the base unit; a traveling endless belt on each of said units mounted to provide opposed, substantially parallel faces adapted to have the food to be brushed disposed therebetween; means for driving said opposed faces in the same direction with substantially the same speed; means guiding intermediate portions of the opposed faces of said traveling belts away from the planes of said opposed faces in the form of loops; a rotating brush on each of said units disposed in the belt loop thereon so that said brushes engage opposite surfaces of food passing through the apparatus between said belts; and means for rotating said brushes, the opposed faces on said traveling belts engaging the surfaces of the food both in front of and in back of said rotating brushes to insure proper passage of the food through the apparatus.

7. Food brushing apparatus comprising: a base unit; a head unit; means interconnecting said base and head units and providing for movement of the head unit to and from the base movement; a traveling endless belt on each of said units mounted to provide opposed, substantially parallel faces adapted to have the food to be brushed disposed therebetween; means for driving said opposed faces in the same direction with substantially the same speed; means guiding intermediate portions of the opposed faces of said traveling belts away from the planes of said opposed faces in the form of loops; a rotating brush on each of said units disposed in the belt loop thereon so that said brushes engage the opposite surfaces of food passing through the apparatus between said belts; and means for rotating said brushes, the opposed faces on said traveling belts engaging the surfaces of the food both in front of and in back of said rotating brushes to insure proper passage of the food through the apparatus, the belt on said head unit having the lower forward portion thereof at the food receiving end of the apparatus in an inclined plane acting as a camming surface engaging the food as it moves rearwardly on the base unit belt to automatically adjust the position of the head unit to accommodate different thicknesses of food.

8. Food brushing apparatus comprising: a base unit and a head unit movable relative thereto; pivoted arm means interconnecting said base and head units so as to effect movement of said head unit toward and away from the base unit while maintained parallel thereto; a driven endless belt on each of said units, said belts having opposed, substantially parallel faces adapted to have the food to be brushed disposed therebetween; a rotating brush on each of said units disposed transversely of said belts in positions to engage the opposite surfaces of food passing therebetween, the belt on said head unit having the lower forward portion thereof at the food receiving end of the apparatus in an inclined plane acting as a cam surface engaging the food as it moves rearwardly on the base unit belt to raise the head unit to automatically adjust the position of the head unit to accommodate different thicknesses of food; a single motor mounted in said base unit; and means interconnecting said traveling belts and brushes with said base unit for driving the traveling belts and rotating the brushes on both the base and head units from said single motor, the driving connection between said motor and the traveling belt and rotating brush on the head unit including driving means carried by, and movable with the pivoted arm means interconnecting the base and head units, the pivotal connections between said arm means and said base and head units being made through shafts which form part of the driving connections for the belt and rotary brush of the head unit.

9. Food brushing apparatus comprising: a base unit and a head unit movable relative thereto; two pairs of arms pivotally interconnecting said base and head units so as to permit movement of said head unit toward and away from the base unit; a traveling endless belt on each of said units disposed to provide opposed, substantially parallel faces adapted to have the food to be brushed disposed therebetween; a drive roller on each of said units for moving said endless belts; shafts on said drive rollers rotatably mounting them in said units, one pair of said arms being pivotally mounted at their opposite ends to said drive roller shafts; a rotating brush on each of said units disposed transversely of said belts in positions to engage the opposite surfaces of food passing therebetween; a driving shaft pivoted in the base unit; a second pair of said arms being pivotally connected at their opposite ends to the shaft of the rotating brush of the head unit and to said base unit driving shaft; a motor mounted in said base unit; and driving means interconnecting said motor and the shafts of the drive roller and brush on the head unit to effect rotation thereof, said driving means including means interconnecting said motor and the shafts of the drive roller and brush on the base unit and means carried by said arms and interconnecting the shafts on which the arms are pivoted.

10. Food brushing apparatus comprising: a base unit and a head unit movable relative thereto; two pairs of arms pivotally interconnecting said base and head units so as to permit movement of said head unit toward and away from the base unit; a traveling endless belt on each of said units disposed to provide opposed, substantially parallel faces adapted to have the food to be brushed disposed therebetween; a drive roller on each of said units for moving said endless belts; shafts on said drive rollers rotatably mounting them in said units, one pair of said arms being pivotally mounted at their opposite ends to said drive roller shafts; a rotating brush on each of said units disposed transversely of said belts in positions to engage the opposite surfaces of food passing therebetween; a driving shaft pivoted in the base unit; a second pair of said arms being pivotally connected at their opposite ends to the shaft of the rotating brush of the head unit and to said base unit driving shaft; a motor mounted in said base unit; and driving means interconnecting said motor and the shafts of the drive roller and brush on the head unit to effect rotation thereof, said driving means including means interconnecting said motor and the shafts of the drive roller and brush on the base unit and means carried by said arms and interconnecting the shafts on which the arms are pivoted, the traveling belt on said head unit having the lower forward portion thereof at the food receiving end of the apparatus in an inclined plane acting as a camming surface engaging the food as it moves rearwardly on the base unit belt to automatically position the head unit to accommodate different thicknesses of food.

References Cited in the file of this patent
UNITED STATES PATENTS

| | | |
|---|---|---|
| 1,670,809 | Hormel | May 22, 1928 |
| 2,817,862 | Frazho et al. | Dec. 31, 1957 |
| 2,827,645 | Miller | Mar. 25, 1958 |